United States Patent [19]

Raven

[11] 4,215,472
[45] Aug. 5, 1980

[54] HIGH-PRESSURE HAND-HELD CUTTING IMPLEMENT

[76] Inventor: M. Robert Raven, P.O. Box 5617, Charleston, Oreg. 97420

[21] Appl. No.: 29,185

[22] Filed: Apr. 12, 1979

[51] Int. Cl.² .......................................... C03B 33/10
[52] U.S. Cl. ................................................ 30/164.95
[58] Field of Search ................. 30/164.9, 164.95, 340, 30/366

[56] References Cited

U.S. PATENT DOCUMENTS

| | | | |
|---|---|---|---|
| 1,201,515 | 10/1916 | Sidon | 30/164.95 |
| 2,421,339 | 5/1947 | Leger | 30/340 X |
| 2,506,922 | 5/1950 | Hansen | 30/164.9 X |
| 3,133,350 | 5/1964 | Benson | 30/164.9 |
| 3,344,518 | 10/1967 | Roth | 30/164.9 |
| 4,040,182 | 8/1977 | O'Dell | 30/164.95 |
| 4,161,819 | 7/1979 | Pietrantonio | 30/164.95 |

Primary Examiner—Jimmy C. Peters
Attorney, Agent, or Firm—Townsend and Townsend

[57] ABSTRACT

A hand-held implement for controlled high pressure cutting or scoring. A grip constructed of relatively high density material and having depressions for the thumb, forefinger and middle finger is connected at its forward end to a cutting or scoring member, such as a carbide wheel for glass cutting. Extending rearward from the grip is an adjustable shaft having on its rearwardmost end a palm rest contoured to receive the portion of the palm between the knuckles of the forefinger and middle finger. The implement is gripped with the thumb and forefingers in their respective depressions and with the portion of the palm between the knuckles of the forefinger and middle finger seated on the palm rest. The side of the middle finger rests within its depression on the grip and the end of the middle finger contacts the surface to be cut or scored. The implement allows controlled movement of the cutting or scoring member for making curved cuts in glass and allows generally equal forces to be applied by the fingers and the palm, thereby increasing the amount of force which can be applied while maximizing control and minimizing hand fatigue.

11 Claims, 3 Drawing Figures

U.S. Patent    Aug. 5, 1980    4,215,472
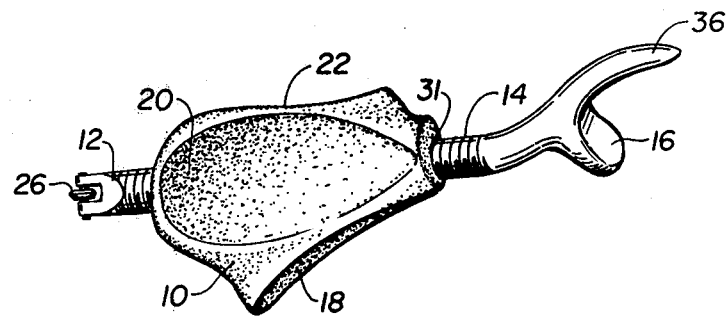
FIG.—1.
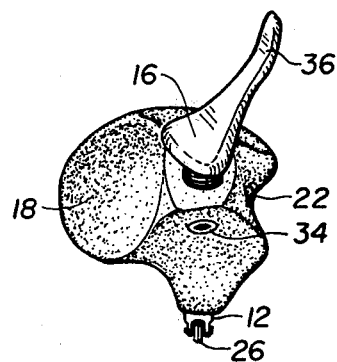
FIG.—2.
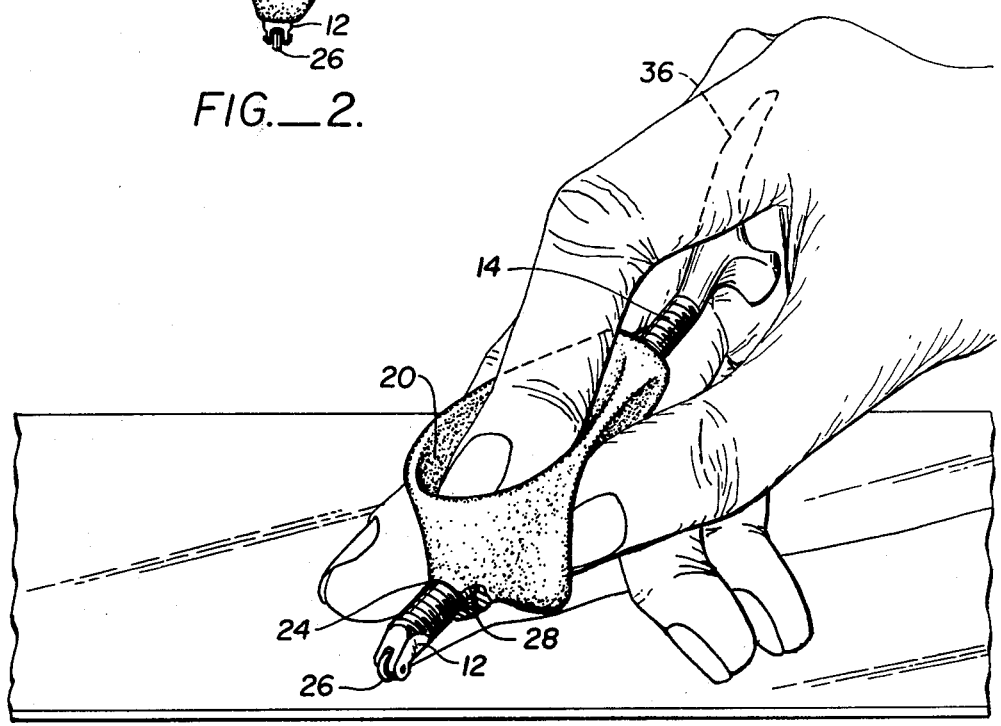
FIG.—3.

HIGH-PRESSURE HAND-HELD CUTTING IMPLEMENT

BACKGROUND OF THE INVENTION

This invention relates to hand-held cutting tools, and more specifically to cutting tools for applying relatively large forces in a highly controlled manner to the object to be cut.

In many applications of leather and glass cutting, such as in the construction of stained glass works and artistic works in leather, a relatively high amount of pressure must be applied to the leather or glass while scoring or cutting, yet the scoring or cutting must be simultaneously performed in a highly controlled and delicate manner. For example, in the creation of various stained glass works, it is often necessary to make numerous curved scores which require that the scoring be done by hand in a very controlled and precise manner. Additionally, in many instances when segments of glass must be cut out of glass panes it is necessary that very large forces be applied by the hand very precisely so that the segment is easily removed without cracking or breaking the surrounding glass.

The conventional hand-held glass cutter comprises generally a shaft having a carbide cutting wheel on one end and a forefinger depression located near the cutting wheel. The conventional glass cutter is difficult to grip and allows forces to be applied by the hand only at one point, namely at the forefinger depression. Accordingly, during long cuts the hand becomes fatigued and the depth of cut correspondingly decreases toward the end of the cut, thereby preventing completion of the cut and often resulting in the breaking of the surrounding glass. Additionally, because of the inability to properly grip the conventional cutter, it is difficult to perform delicate cutting maneuvers on the glass. These instruments were designed previously to the development of high pressure cutting techniques and are not suitable for use when such techniques are employed.

A removable holder adapted for the conventional glass cutter, as disclosed in U.S. Pat. No. 2,892,291, permits both the middle finger and the thumb to grip the cutter. The holder disclosed in the U.S. Pat. No. 2,892,291, when fitted onto a conventional glass cutter, makes the performance of curved cuts difficult because gripping the holder requires that the middle finger and thumb be squeezed together. It is thus difficult to apply side forces in order to turn the cutting wheel into a curved path and, in addition, because of the constant squeezing of the middle finger and thumb to grip the cutter, the hand becomes easily fatigued.

SUMMARY OF THE INVENTION

The present invention provides a hand-held implement for precisely controlled relatively high pressure cutting or scoring and comprises generally a grip constructed of high density material and having depressions for the thumb, forefinger and middle finger, a cutting member extending forward of the grip, and a shaft extending rearward of the grip and having means for resting on a portion of the palm.

The grip is constructed of high density material, thereby stabilizing the cutter and facilitating the application of large forces to the object to be cut. The grip has three depressions contoured to receive the thumb, forefinger, and middle finger, respectively, of the user.

Extending forwardly from the grip is the cutting member which includes a scoring element such as a carbide wheel, blade or sculpting tool for cutting or scoring a hand material such as glass, the cutting or scoring element being oriented with its plane intersecting generally the midpoint of the forefinger depression such that when the force is applied to the grip by the forefinger, it is transmitted almost entirely within the plane of the element. The thumb and middle finger depressions are located on the sides of the grip and permit the implement to be easily maneuvered in lateral directions, as required to perform delicate curved cuts. The depression for the middle finger is somewhat shallower than the other depressions, which allows the middle finger to extend beyond the grip and contact the object to be cut. In such a manner, the middle finger, for example in the cutting of glass, rides on the surface of the glass and guides the element in the desired direction.

Extending from the rear portion of the grip is an adjustable shaft having on its rearwardmost end a palm rest contoured to receive the small portion of the palm located between the knuckles or the forefinger and middle finger. The shaft is adjustable so that the distance between the palm rest and the depressions on the grip may be varied, thus making the implement adjustable to comfortably fit various sizes of hands. The palm rest permits both the stabilization of the cutting implement in use and the application of an additional force from the palm of the hand, thereby increasing the amount of force which could be controlled by the fingers, minimizing hand fatigue and retaining maximum control.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a top plan view of the cutting implement in use;

FIG. 2 is a rear view of the cutting implement in use; and

FIG. 3 is a perspective view of the cutting implement in use.

DESCRIPTION OF THE PREFERRED EMBODIMENT

Referring first to FIGS. 1 and 2, the cutting implement of the present invention comprises generally a grip 10, a cutting, scoring or sculpting member 12 extending forward from grip 10, and a shaft 14 extending rearward from grip 10 and having a palm rest 16 at its rearwardmost end.

The grip 10 has three spaced-apart depressions for receiving the first three fingers of the user's hand. Depression 18 on the left side of grip 10 receives the thumb, depression 20 on the top side receives the forefinger, and lateral depression 22 on the right side receives the middle finger. Depressions 18 and 20 are generally similarly shaped to conform to the contour of the bottom and end of the user's thumb and forefinger, respectively. Depression 22, however, has a grooved contour to receive generally only the side of the user's middle finger so that the end of the middle finger may contact the surface to be cut, as will be more fully explained below. Grip 10 may be constructed of any suitable material, but is preferably constructed of relatively high density material, such as brass, so that the cutting implement has sufficient weight to assist the user's hand in applying the cutting forces. Additionally, the relatively heavy weight of grip 10 provides stability during operation and is more resistant to anomalous forces or movements of the user's hand than a relatively lightweight grip. This grip may also be coated with rubber to decrease impact damage if dropped on glass.

As illustrated in FIG. 3, cutting member 12 is releasably connected to grip 10 and extends from the forward end of grip 10. In one embodiment, the cutting member 12 comprises a shaft threaded on one end for engagement into a threaded bore 24 on the forward end of grip 10 and having a carbide wheel 26 on its other end. In other embodiments of the invention, a blade or sculpting tool may be employed as the cutting or scoring element. A set screw 28 is threaded into a bore on the underside of grip 10 and contacts the shaft of cutting member 12 to secure cutting member 12 within bore 24 in grip 10. The threaded engagement of cutting member 12 into grip 10 and the use of set screw 28 to secure cutting member 12 to grip 10 permits the cutting member to be replaced and to be adjusted in a lengthwise direction if it is desired to adjust the distance between wheel 26 and the depressions on grip 10. Cutting member 12 can also be rotated 360° to maximize angle advantage and adjust to the individual need.

As illustrated in the accompanying drawings, cutting member 12 includes a carbide wheel 26 for cutting glass. Referring to FIG. 1, it will be noted that the plane of the cutting wheel intersects generally the midpoint of forefinger depression 20. This orientation of cutting wheel 26 relative to forefinger depression 20 permits the force applied by the user's forefinger to be directed almost entirely within the plane of the cutting wheel, thus preventing any substantial lateral forces at the point where carbide wheel 26 contacts the surface to be cut. While the drawings illustrate a carbide wheel for cutting glass, any cutting edge may be inserted into grip 10, such as a diamond point for cutting glass, or any suitable instrument for cutting or sculpting leather and other materials where high pressure and precision control are required.

Referring again to FIGS. 1 and 2, shaft 14 is threadably engaged into a bore 31 at the rear end of grip 10 and extends rearward from grip 10. Shaft 14 may be threaded into or out of bore 31 in grip 10 so as to lengthen or shorten the distance it extends out from grip 10 and to select an angle suitable to the user. A set screw 34 (FIG. 2) located on the underside of grip 10 near its rear end is threaded into a bore (not shown) and contacts the portion of shaft 14 extending into bore 31 for securing shaft 14 within grip 10. At the rearwardmost end of shaft 14 is palm rest 16 contoured to receive the portion of the palm between the knuckles of the user's forefinger and middle finger. The upper portion 36 of palm rest 16 is curved upward and rearward for extending upward and between the forefinger and middle finger, as illustrated in FIG. 3.

Referring now to FIG. 3, the operation of the implement may be better understood. The cutting implement is first adjusted to fit the particular user's hand. Set screw 34 is loosened and shaft 14 is either threaded into or out of bore 31 in grip 10 until palm rest 16 is located the proper distance and angle from grip 10, after which set screw 34 is tightened. This particular distance is selected so that during the application of forces to the surface to be cut, the finger and thumb, when extended, are fully seated within the depressions 18, 20 on the grip at the same time that the portion of the palm between the forefinger and middle finger is seated on palm rest 16. The proper selection of this distance permits generally equal forces to be applied to the surface by the thumb, forefinger and the palm. As should be apparent, if palm rest 16 were located too close to grip 10, the forefinger could not be fully extended and it would thus not be possible to adequately apply cutting forces to the implement by the forefinger.

As shown in FIG. 3, the thumb is fully received into depression 18, the forefinger is fully received into depression 20, and the middle finger rests within the grooved lateral depression 22 on the right side of grip 10 and extends to contact the surface, in this case, the glass surface. The contacting of the surface by the middle finger during use, while generally not required, is preferred in the cutting of glass with the present invention in order to stabilize the cutting implement and to facilitate the making of curved cuts. In the application of forces to the cutting implement and specifically to the carbide wheel 26, the forces applied by the forefinger, the thumb, and the palm are generally equal. The arrangement of depressions 18, 20 and palm rest 16 in spaced relationship to one another permits this generally equal distribution of forces and reduces hand fatigue during cutting.

As should now be apparent, the present invention provides a controllable high pressure cutting implement for cutting glass, leather or any other suitable material. The relative location of the finger receiving depressions and the palm rest substantially reduces fatigue while permitting the additional application of forces to the cutting wheel by the palm, heretofore not possible with conventional glass cutters. Because the depressions generally receive the shape of the fingers, tight gripping of the cutter is not required and all of the forces are applied either parallel to or into the plane of the cutting wheel, rather than transversely as is common in conventional glass cutters where the fingers must be squeezed together to grip the cutter. The provision of palm rest 16 and lateral depression 22 for the middle finger permit highly controlled and stabilized operation of the cutter as is required to perform delicate cuts in stained glass.

While the preferred embodiments of the present invention have been illustrated in detail, it should be apparent that modifications and adaptations of those embodiments will occur to those skilled in the art. However, it is to be expressly understood that such modifications and adaptations are within the sphere and scope of the present invention as set forth in the following claims.

What is claimed is:

1. A hand-held implement for controlled relatively high pressure cutting and scoring of a material comprising:
   a grip having depressions for receiving the thumb, forefinger and middle finger;
   a member extending forwardly of said grip and having an edge for cutting or scoring said material; and
   a shaft extending rearwardly of said grip and adapted for placement between the knuckles for stabilizing and adding additional pressure to said cutting member during cutting or scoring.

2. The implement according to claim 1 wherein said member is removably and adjustably connected to said grip.

3. The implement according to claim 1 wherein said member includes a carbide wheel for cutting glass.

4. The implement according to claim 3 wherein the plane defined by said carbide wheel intersects generally the midpoint of said forefinger depression, whereby the force applied by the forefinger and thumb and palm during cutting is directed generally in the plane of said wheel.

5. The implement according to claim 1 including a palm rest on the rearwardmost end of said shaft, said palm rest being contoured to receive the portion of the palm between the forefinger and middle finger.

6. The implement according to claim 5 wherein the length and angular inclination of said shaft extending from said grip is adjustable.

7. The implement according to claim 1 wherein said grip is constructed of relatively high density material.

8. A hand-held implement for controlled relatively high pressure cutting or scoring comprising:
   a grip having depressions for receiving the thumb, forefinger and middle finger;
   a wheel having a circumferential edge for cutting or scoring connected to said grip proximate its forward portion, said wheel defining a plane which intersects generally the midpoint of the forefinger depression on said grip, whereby the force applied by the forefinger is transmitted generally in the plane of said wheel; and
   a shaft extending from the rearward portion of said grip and having, on its rearwardmost end, a palm rest contoured to receive the portion of the palm between the forefinger and middle finger so that an additional force may be applied by the palm of the hand, the length of said shaft extending from said grip being adjustable, whereby the distance between the palm rest on said shaft and the depressions on said grip may be varied.

9. The implement according to claim 8 wherein the shaft is rotationally adjustable relative to the grip throught 360° to accommodate the user.

10. The implement according to claim 8 wherein said grip is constructed of relatively high density material.

11. The implement according to claim 8 wherein said cutting wheel is removably connected to said grip.

* * * * *